United States Patent [19]
Carrera

[11] Patent Number: 4,514,065
[45] Date of Patent: Apr. 30, 1985

[54] THIN BLADE MEMBERS HAVING MAGNETIC REPELLING FORCES THEREBETWEEN

[75] Inventor: Jacinto P. Carrera, Chestnut Hill, Mass.

[73] Assignee: Polaroid Corporation, Cambridge, Mass.

[21] Appl. No.: 399,754

[22] Filed: Jul. 19, 1982

[51] Int. Cl.³ .............................................. G03B 9/14
[52] U.S. Cl. .................................... 354/235.1; 308/10
[58] Field of Search ............... 354/245, 246, 248, 226, 354/227, 234, 235, 230, 247, 270, 271.1; 308/10

[56] References Cited

U.S. PATENT DOCUMENTS

| | | | |
|---|---|---|---|
| 3,557,678 | 1/1971 | Bellows | 95/53 |
| 3,685,423 | 8/1972 | Dahlgren | 95/57 |
| 4,024,552 | 5/1977 | Kondo | 354/234 |
| 4,051,499 | 9/1977 | Kondo | 354/234 |
| 4,079,400 | 3/1978 | Kondo | 354/234 |
| 4,240,728 | 12/1980 | Wiedmann et al. | 354/38 |
| 4,313,659 | 2/1982 | Saito et al. | 354/246 X |
| 4,326,787 | 4/1982 | Senuma | 354/246 |

*Primary Examiner*—John Gonzales
*Attorney, Agent, or Firm*—Leslie J. Payne

[57] ABSTRACT

An apparatus is disclosed comprising a movable member and means for mounting the movable member for movement along a given path. The mounting means defines a surface adjacent the given path. For generating repelling magnetic forces which act on and between the movable member and the surface so as to facilitate relative movement therebetween, there is provided permanent magnetic fields in operative relationship with the surface and the member.

14 Claims, 6 Drawing Figures

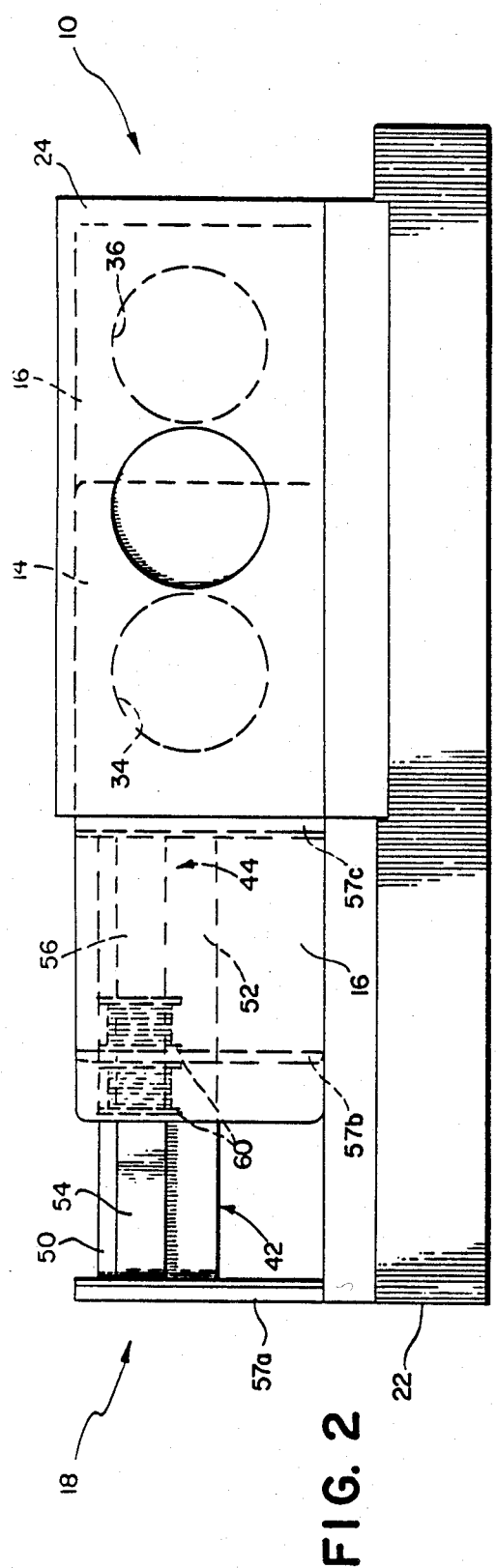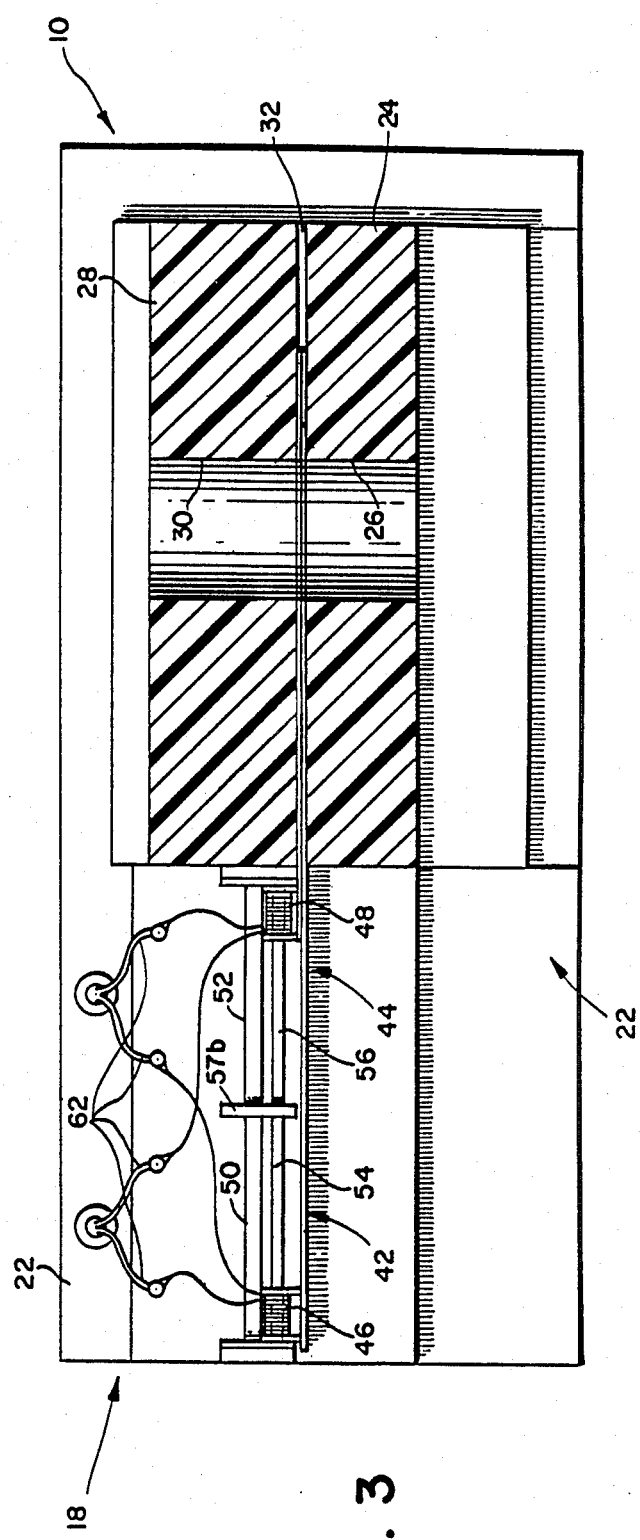
FIG. 2
FIG. 3

THIN BLADE MEMBERS HAVING MAGNETIC REPELLING FORCES THEREBETWEEN

BACKGROUND OF THE INVENTION

This invention relates, in general, to exposure control mechanisms and, in particular, tape-like blades which are driven, preferably, electromagnetically.

Heretofore, a variety of blade mechanisms have been proposed for use in controlling scene light along an optical path. With the advent of miniature cameras and with the desire to program shutter blade movement, it becomes highly advantageous to reduce, even more, the size and weight of the shutter mechanism components. Towards this end it is desirable to have the blades relatively light in weight so as to facilitate acceleration thereof from zero to desired speed. Additionally, it is desirable to have the blades move as silently as possible and be simple and inexpensive to manufacture. Moreover, while possessing the above characteristics, the blades should be sufficiently strong and yet not be too resistant to bending so as to be able to pass over rollers or the like.

However, with very thin blades the strength, durability and light proofness thereof are lessened. There are additional drawbacks with blades made of such thin material. One major problem is the fact that the thinner the material is the more difficult it is to move without causing folds in the blade during advancement of the latter. This is especially true when the blades are being pushed along their path of travel and encounter sliding friction. Several suggestions have been put forth to prevent this uncontrolled bending or bowing of the blade. One, for instance, is disclosed in U.S. Pat. No. 3,685,423 which suggests the use of flat plastic foils which have corrugated surfaces which are at right angles to the direction of blade travel. As a result, the shutter blade possesses sufficient resistance to bending in a direction generally perpendicular to its direction of travel. A difficulty with using corrugations or grooves to obtain optimal mechanical strength is that there must be a fairly precise distribution of the grooves as well as appropriate sizes thereof for the shutter blade to perform optimally.

SUMMARY OF THE INVENTION

It is an object of the present invention to improve upon known mechanisms advancing movable members, especially exposure control mechanisms of the type employing thin blade members.

Towards this end there is provided an apparatus comprising a movable member and means for mounting the movable member for movement along a given path. Included in the mounting means is a surface formed adjacent the given path. In the present invention there are provided means for generating repelling magnetic forces which act on and between the movable member and said surface so as to facilitate relative movement therebetween. Such generating means includes means for defining permanent magnetic fields in operative relationship with the surface and movable member to create the repelling magnetic forces.

In an illustrated embodiment, there is provided an exposure control mechanism for controlling electromagnetic energy along an optical path including a blade member, and means for mounting the blade member for movement along a given path between unblocking and blocking conditions relative to the optical path intersecting the given path. The mounting means includes a surface adjacent the given path. There is provided means for establishing magnetic repulsion forces which act on the member and the surface so as to create a clearance therebetween which facilitates movement therebetween.

In another illustrated embodiment, there is provided an exposure control mechanism comprising at least a pair of thin blade members, each of which has means for defining a magnetic field extending from at least a surface portion thereof, wherein the extending magnetic fields have the same polarity. Means are provided for mounting the blade members for movement relative to each other along a given path and relative to an optical path intersecting the given path. Included in the mounting means is means for providing a pair of opposed supporting surfaces defining a space therebetween in which the blade members move when traveling along the given path. These supporting surfaces support the blade members so that they do not bend in a direction generally normal to blade member travel when in said space and so that the blade portions are adjacent and facing towards each other. Owing to this arrangement, magnetic repelling forces are generated by and between the blade members so as to create a clearance therebetween which facilitates movement of the blade members.

In a preferred embodiment, the magnetic field defining means includes a layer of magnetic material covering the surface portion of each blade which is made of bendable material.

In another preferred embodiment, the exposure control mechanism comprises driving means including a pair of electromagnetic actuators, each having a stationary armature which is generally aligned with the stationary armature of said other actuator. Each actuator includes a permanent magnet defining a magnetic field extending generally transversely to its respective armature, and an energizeable coil assembly mounted on its respective armature and in operative relationship to the field for displacement therealong. Each of the coil assemblies is operatively connected to a respective one of the blade members and is displaceable in directions opposite to each other when both are energized. Included is means for isolating magnetic lines of flux of one of the actuators with respect to the other, whereby the assemblies when energized can move in opposite directions toward each other without any bucking effect therebetween.

Among the other objects of the invention are, therefore, the provision of an improved apparatus for facilitating movement of one member relative to another by creating repelling magnetic forces therebetween through the use of permanent magnets; the provision of an improved exposure control mechanism employing thin blades; the provision of an improved mechanism of the above type in which the blades carry permanent magnet material and are arranged in a fashion so that magnetic repelling forces are established which act on and between the blades so as to facilitate movement of the shutter blades relative to each other; the provision of an improved electromagnetic drive system which drives the blades in a manner so they do not have to extend from supporting plates; and the provision of an improved drive system in which a pair of electromagnetic actuators have a flux barrier therebetween which permits closely spaced energized coil assemblies to move towards each other without any bucking effect therebetween.

Other objects and further scope of applicability of the present invention will become apparent after reading a detailed description thereof when taken in conjunction with the accompanying drawings in which like parts are designated by like reference numerals.

BRIEF DESCRIPTION OF THE DRAWINGS

FIG. 1A is a view showing the arrangement of the blades to produce magnetic repelling forces therebetween;

FIG. 2 is an elevational view showing the embodiment of FIG. 1 with the blades in a scene blocking condition;

FIG. 3 is a plan view, similar to FIG. 2 and partly in cross-section, showing the blades in an unblocking condition;

DETAILED DESCRIPTION

Figure 1:
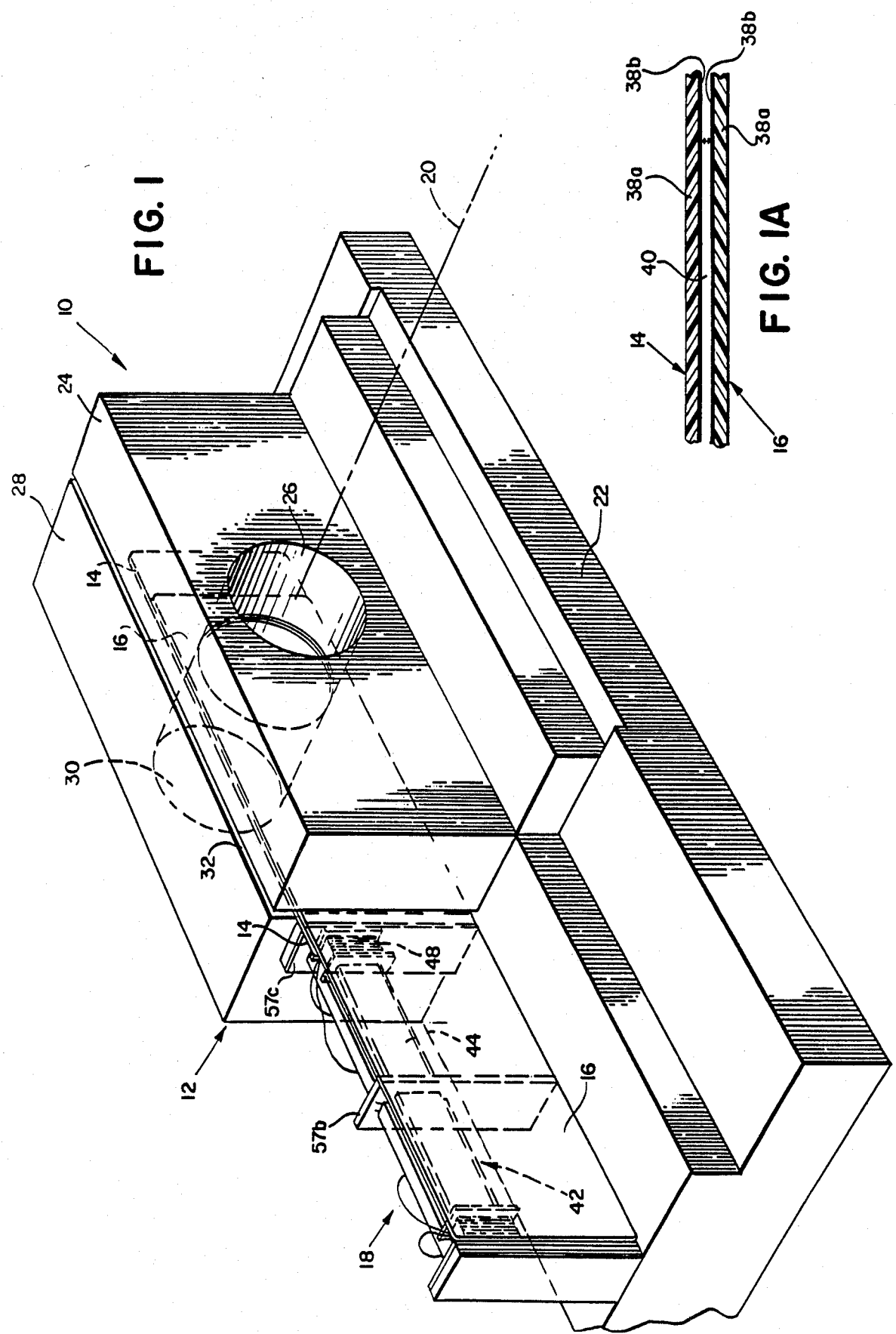
FIG. 1 is a perspective viewing showing an exposure mechanism of the present invention.

Reference is now made to FIGS. 1-3 for illustrating an embodiment of an exposure control mechanism 10 made in accordance with the principles of the present invention and which controls electromagnetic radiation traveling along an optical path.

In this embodiment, the exposure control mechanism 10 includes essentially a blade mounting assembly 12, a pair of thin tape-like shutter blades 14, 16, and a blade drive system 18 operatively connected to the blades 14, 16 for driving the latter between unblocking and blocking conditions relative to an optical path generally indicated at 20 and extending transversely to the blades.

Included in the mounting assembly 12 is an elongated base block 22 which slidably supports thereon the blades 14, 16. Connected to the base block 22 is an aperture plate 24 having formed therein an aperture 26, which facilitates passage therethrough of image forming rays. A second aperture plate 28 is also connected to the block 22 in spaced apart and generally parallel relationship to the aperture plate 24. The plate 28 has an aperture 30 axially aligned with the aperture 26. The aligned apertures 26, 30 can define a path leading to a focal plane of a camera (not shown) or to a photocell. The aperture plates 26, 30 are positioned to define a longitudinally extending space 32 therebetween which is sized so as to support the blades 14, 16 in their generally planar and parallel relationship so as to avoid the tendency of the thin blades to uncontrollably bend or fold when between the plates.

Reference is now made to the blades 14, 16. These blades 14 and 16 have apertures 34, 36; respectively, formed therein and are longitudinally movable with respect to the optical path 20. The blades 14, 16 are of the scanning type and are operable to reciprocate between blocking (FIG. 2) and unblocking (FIG. 3) conditions in response to operation of the blade drive system 18. As such, the blade apertures 34, 36 progressively coincide to define progressively varying aperture openings.

In this particular embodiment, the blades 14, 16 are comprised of thin, magnetic recording tape. Reference is made to FIG. 1A which shows both blades having a plastic layer 38a made of Mylar, and coextensive therewith a magnetic layer 38b made of ferrous oxide. The ferrous oxide layer 38b is, of course, magnetically permeable and establishes its own permanent magnetic field extending from the oxide layer 38b. In the illustrated embodiment, the layers 38b have the same magnetic polarity extending therefrom.

The present invention contemplates that the blades 14, 16 could be made out of other thin bendable material, wherein at least one side thereof has a magnetic field extending therefrom, preferably, in a direction generally transverse to the direction of blade travel. When the blades 14, 16 are mounted, the magnetic layers 38b are arranged to face and be in close proximity with each other. As noted, since the layers 38b have the same magnetic polarity facing each other, a magnetic repelling force is generated by and therebetween. Such force is sufficient to create a clearance 40 therebetween which eliminates sliding frictional resistance between the blades 14 and 16. In effect this serves as a magnetic bearing between the blades 14, 16 during their counter-reciprocatory motion. The present invention contemplates that even if the layers 38b contact each other the sliding friction therebetween is reduced. While the present embodiment discloses use of a layer of flexible bendable magnetic material on the shutter itself, it will be appreciated that the present invention contemplates that the magnetic material used for creating the noted repelling forces need not be on the blades themselves, but could be operatively associated with the blades for establishing such repelling forces.

Because of the clearance 40, the tendency of those portions of the blades outside the aperture plates 24, 28 to bend or curl, in a direction transverse to blade displacement, is reduced significantly. Moreover, because of this clearance noise caused by movement of the blades with respect to each other is also reduced.

Reference is now made to the electromagnetic shutter blade drive system 18. The drive system 18 includes a pair of linearly arranged electromagnetic actuators 42, 44 which are independently connected to the blades 14, 16; respectively, and simultaneously driven by a control circuit (not shown) which is connected to, preferably, a DC power source (not shown).

The actuators 42, 44 respectively include coil assemblies 46, 48; permanent magnets 50, 52; and stationary armatures 54, 56. Both the actuators 42, 44 are mounted in closely spaced, axial relationship to each other on the block 22 by upstanding support plates 57a-c. Each of the coil assemblies 46, 48 include excitation windings 58 wrapped about a plastic bobbin 60. The bobbins 60 are connected to the blades 14, 16. The windings 58 are connected by the leads 62 to the control circuit. The bobbins 60 are slidable on the stationary armatures 54, 56 which are made of ferromagnetic material. It will be appreciated that the supports 57a-c limit displacement of the coil assemblies 46, 48. The permanent magnets 50, 52 are, preferably, of the rare earth type, such as samarium cobalt and have their fields extending so as to encompass the coils. In the illustrated embodiment, they are arranged so that a north pole of the magnet 50 faces the coil assembly 46, while a south pole of the permanent magnet 52 faces the coil assembly 48. The coil assemblies 46, 48 are connected in parallel and when energized, they react with the magnetic fields of their respective adjacent magnets. Such reaction produces longitudinal displacement of the coil assemblies 46, 48.

The direction and speed of the coil assemblies 46, 48 will be a function of the amplitude and polarity of the current traveling through the windings 58. Because the noted magnetic polarity of the magnets 50, 52 are opposite, and the coil assemblies 46, 48 have current flowing therethrough with the same polarity, the coil assemblies will travel in opposite directions with respect to each other when simultaneously energized. In other words, they will move simultaneously towards each other and away from each other. To effect a change in direction of the coil assemblies, the polarity of current to the coil assemblies is reversed. The foregoing movement of the coil assemblies can be achieved in a number of ways. For instance, the magnetic fields of the permanent magnets 50, 52 can be the same and the polarity of current through the coil assemblies can be in opposite directions.

In accordance with the present invention, the upstanding plate 57b is interposed between the electromagnetic actuators 42, 44 to isolate the magnetic lines of flux. In other words, the flux from the actuator 42 will not affect operation of the actuator 44, while the flux from the actuator 44 will not affect operation of the actuator 42. In this regard, the plate 57b is made of a magnetically non-conducting material. In this manner, the coil assemblies 46, 48 can move towards each other in the manner shown without any bucking effect therebetween. This is significant because the counter-reciprocating movement of the blades 14, 16 will not be affected adversely. Moreover, since there is no bucking, the actuators can be closely spaced to each other in axial relationship. This promotes space-saving considerations.

Figure 4:
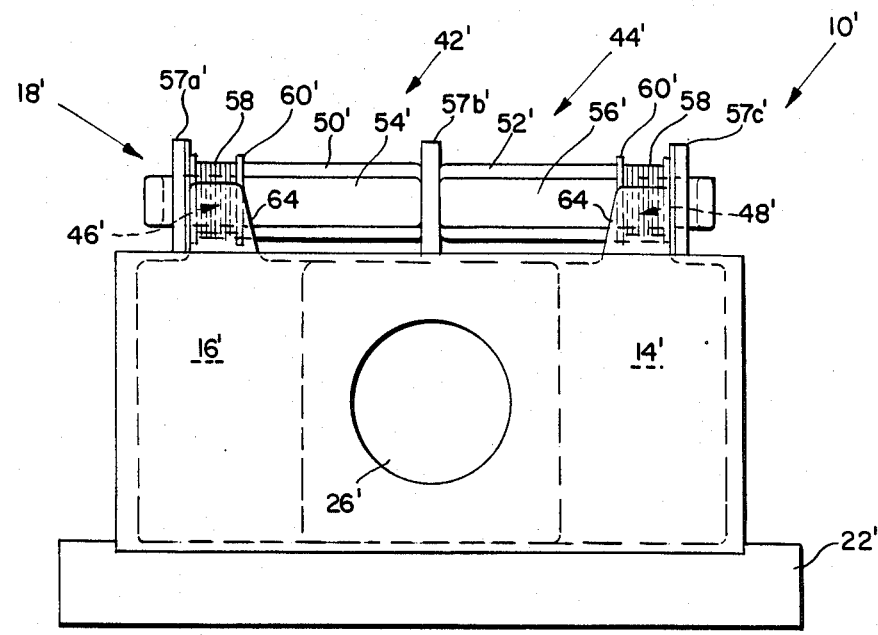
FIG. 4 is an elevational view showing another embodiment of the present invention with the blades thereof in a scene light admitting condition; and, FIG. 5 is a plan view of the embodiment shown in FIG. 4.
Figure 5:
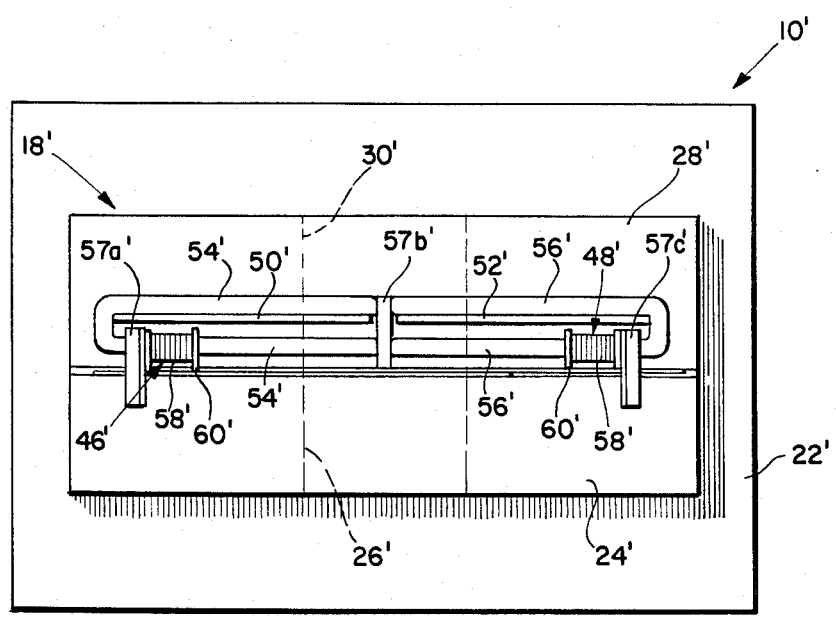

Reference is now made to FIGS. 4 and 5 to show another embodiment of the present invention. In this embodiment, structure which is like structure of the previous embodiment will be indicated by the same reference numerals with, however, the addition of a prime marking. As illustrated, the electromagnetic drive system 18' is mounted on the aperture plate 28'. In this embodiment, the blades 14', 16' have upstanding tabs 64 which are connected respectively to the bobbins 60' of the respective actuators 42', 44'. It will be appreciated that the blades 14', 16' are not pushed from positions outside the aperture plates 24', 28' into the space between the plates. Because of the drive system 18' being mounted above the blades 14', 16', the blades need not be as long. Consequently, not only are the blades shorter and correspondingly lighter, but importantly they do not have to extend from the aperture plates 24', 28'. Thus, there is no tendency for those portions of the blades outside the plates 24', 28' to bend in directions generally normal to the direction of blade travel. It should be pointed out that in this embodiment the armatures 54', 56' have a generally U-shape. This shape enhances the efficiency of the actuator.

Since certain changes may be made in the above-described apparatus without departing from the scope of the invention herein involved, it is intended that all matter contained in the description or shown in the accompanying drawings shall be interpreted as illustrative and not in a limiting sense.

What is claimed is:

1. An exposure control mechanism for controlling electromagnetic radiation comprising:
   a pair of blade members;
   means for mounting said blade members for movement along a given path between and relative to the optical path which intersects the given path for controlling electromagnetic radiation;
   means on said blades and facing each other for establishing repelling magnetic forces which act on and between said blade members for defining a clearance therebetween which facilitates relative movement therebetween; and,
   means for driving said blade members.

2. The mechanism of claim 1 wherein said establishing means includes a permanent magnet on one blade in operative relationship with a permanent magnet on the other blade member, wherein said magnets having the same magnetic polarity and face each other so as to establish the repelling forces.

3. The mechanism of claim 2 wherein each of said blade members is made of a thin bendable material and said magnet carried thereby is defined by a layer of magnetic material covering at least a portion of said blade member.

4. An exposure control mechanism for controlling electromagnetic radiation comprising:
   at least a pair of thin blade members, each of said blade members having means for defining a magnetic field extending from at least a surface portion thereof, wherein said magnetic fields extending from said surface portions have the same polarity;
   means for mounting said blade members for movement relative to each other along a given path and relative to an optical path intersecting the given path, said mounting means including means for providing a pair of opposed supporting surfaces defining a space therebetween in which said blade members move when traveling along the given path, said supporting surfaces supporting said blade members so that they do not tend to bend in a direction generally normal to blade member travel when in said space, said surfaces supporting said blade surface portions so that they are adjacent and facing towards each other, whereby magnetic repelling forces are generated by and between said field defining means so as to create a clearance therebetween when at least in said space so as to facilitate movement of said blade members relative to each other.

5. The mechanism of claim 4 further including means coupled to each of said blade members for driving said blade members between said blocking and unblocking conditions.

6. The mechanism of claim 5 wherein said blade members are bendable and said magnetic field defining means includes a layer of magnetic material covering said surface portion.

7. The mechanism of claim 5 wherein said driving means is coupled to said blade members such that said blade members do not extend beyond said supporting surfaces when traveling between the blocking and unblocking conditions.

8. The mechanism of claim 5 or 7 wherein said driving means includes a pair of electromagnetic actuators each having a stationary armature which is generally aligned with said armature of the other actuator, each of said actuators including a permanent magnet defining a magnetic field with a given polarity extending generally transversely to its respective armature, and an energizeable coil assembly mounted on its respective armature and in operative relationship to the field of its respective magnet for displacement therealong, each of said coil assemblies being operatively connected to respective ones of said blade members, the polarity of said magnets and the polarity of current through said coils being arranged such that when said coil assemblies are energized both are displaceable in directions opposite to each other; and means for isolating magnetic lines of flux of one of said actuators with respect to the other of said actuators, whereby said assemblies can move in opposite directions toward each other without any bucking effect therebetween.

9. A blade mechanism comprising at least a pair of blade members, means for mounting said blade members for movement along a given path with one planar surface of one of said blade members in facing relation to one planar surface of the other of said blade members, drive means for advancing said blade members relative each other along said given path, and magnetic means for providing repelling magnetic fields at the facing surfaces of said blade members to reduce the frictional engagement therebetween, said mounting means supporting said blade members for movement along said given path with one planar surface of a first of said blade members in facing relation to one planar surface of the other of said blade members such that each blade member provides a guide surface for the other, and said magnetic means provides oppositely directed magnetic fields at the facing surfaces of said blade members to reduce the frictional engagement therebetween.

10. The mechanism of claim 9 wherein said mounting means supports said blade members for movement in opposite directions along said given path and said drive means includes means for advancing said blade members in opposite directions relative to each other.

11. The mechanism of claim 9 wherein said blade members are thin relatively flexible members, said drive means includes means for pushing and pulling said blade members back and forth across the optical path, and said magnetic means reduces the frictional engagement between the facing surfaces of said blade members and thus forces resisting the relative motion thereof such that bending of said blade members is minimized.

12. The mechanism of claim 11 wherein said blade members are magnetic tape material, have base material coated with magnetic material on their facing surfaces.

13. The mechanism of claim 9 wherein said blade members are magnetic tape material having a thin flexible base coated at least on its said one surface with a magnetic material.

14. A blade mechanism comprising at least a pair of blade members, means for mounting said blade members for movement along a given path with one planar surface of each of said blade members in facing relations to the other, drive means for advancing said blade members relative each other along said given path, and permanent magnetic means on said blades for providing repelling magnetic fields at the facing surfaces of said blade members to reduce the frictional engagement therebetween.

* * * * *